Nov. 22, 1932.                F. RAFFLES                 1,888,289
                              TOOL HOLDER
                          Filed Dec. 28, 1929
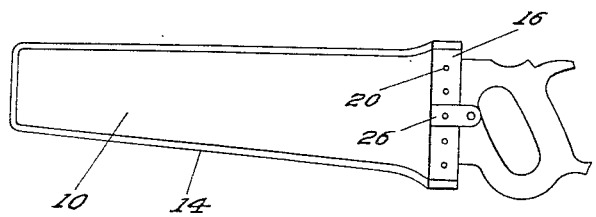
FIG. 1
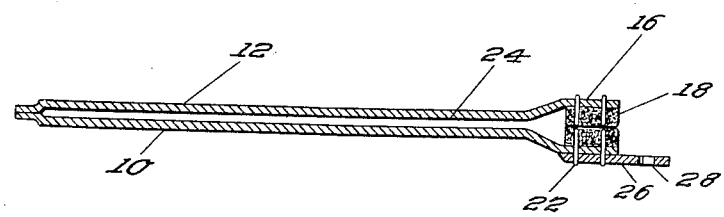
FIG. 2
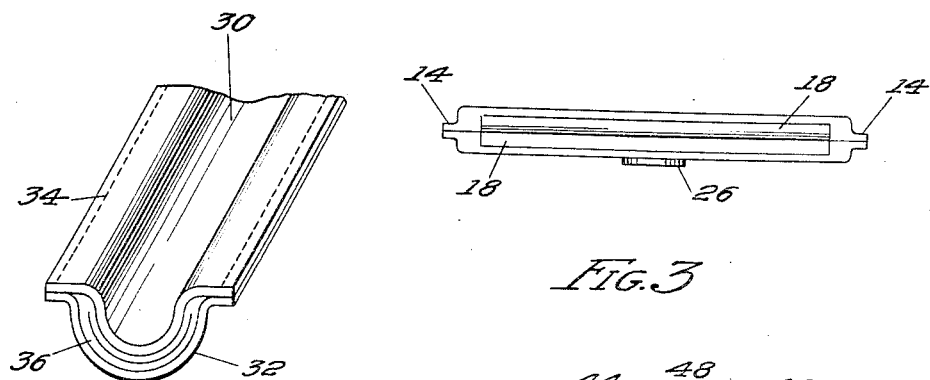
FIG. 3
FIG. 4
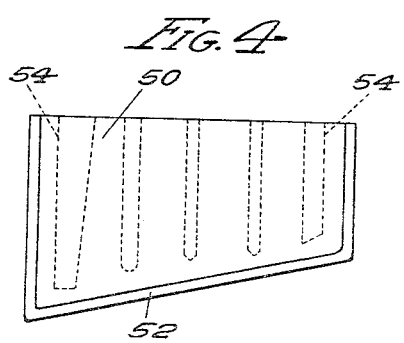
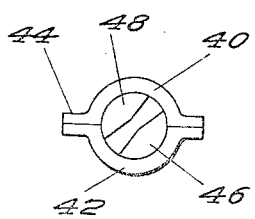
FIG. 5
FRANK RAFFLES
INVENTOR
PER
Albert J. Fihe
ATTORNEY
FIG. 6

Patented Nov. 22, 1932

1,888,289

UNITED STATES PATENT OFFICE

FRANK RAFFLES, OF CHICAGO, ILLINOIS, ASSIGNOR TO HARRY RAFFLES, OF CHICAGO, ILLINOIS

TOOL HOLDER

Application filed December 28, 1929. Serial No. 417,231.

This invention relates to an improved tool holder, and has for one of its principal objects the provision of means for holding or supporting tools, and particularly such tools as have sharp edges, such as saws, knives, chisels, drills, cutlery, barbers' tools, shears, or the like, which edges are protected in the special holder of this invention.

One of the important objects of this invention is to provide, in a holder for metal objects, means for automatically keeping the object oiled or greased when not in use, and for removing surplus grease therefrom upon withdrawal from the holder, and also protecting the sides or edges from damage by nicking or contact with other objects.

Still another and further important object of this invention is the provision, in a holder for tools, of means for supporting in convenient position for the user a plurality of tools, any one of which may be selectively withdrawn from the holder, which is of such shape and material as to be economically manufactured and readily accessible at all times.

Another and still further important object of the invention is the provision, in a tool holder or casing, of a sheath or the like composed of fabric, die-pressed or otherwise shaped to conform to the outline of the tool adapted to be contained or supported, the fabric being preferably treated so as to render the same impervious to oil, moisture, and the like while at the same time being quite cheap and economical of manufacture.

Other and further important objects of the invention will be apparent from the disclosures in the accompanying drawing and following specification.

The invention, in a preferred form, is shown in the drawing and hereinafter more fully described.

In the drawing:

Figure 1 is a side elevation of an improved tool holder constructed in accordance with the principles of this invention showing the same as supporting a saw.

Figure 2 is a longitudinal section of the device shown in Figure 1.

Figure 3 is an end view thereof.

Figure 4 is a perspective view of one end of a holder for a gouge or the like.

Figure 5 is an end view of a holder for a drill.

Figure 6 is a side elevation of a composite holder for a plurality of tools.

As shown in the drawing:

The reference numeral 10 indicates generally a sheath or container for the blade of a tool such as a saw or the like, the same comprising generally a section of shaped or die-pressed fabric such as buckram, linen, cotton, or similar cloth, or of any similar fabric-like material such as leather, imitation leather, thin wood or metal. Celluloid, wood flour, and phenol condensation products molded into shape may also be used. Preferably, the fabric is impregnated with a waterproofing and grease-proofing composition either before or after shaping, the impregnation before shaping sometimes aiding in the die-pressing work and also aiding in retaining said shape. The fabric may also be treated after shaping by impregnating or coating in various ways such as by spraying a coating of metal or lacquer thereon.

As illustrated the sheath comprises two similar die-pressed or formed portions 10 and 12 which have laterally extending adjoining edges 14, these edges being fastened together by means of stitches, rivets, glue, or the like in any convenient or desired manner.

At the end of the saw blade or other tool ends in the holder, the side portions are flared outwardly as illustrated at 16, and inside these flared portions is positioned a pair of felt pads or the like 18, the same being fastened in place by means of rivets 20, or by lines of stitching or the like as best shown at 22 in Figure 2. Glue may also be used. The flare of the side portions 10 and 12 and the relation of the felt pads thereto is such that the felt pads abut each other quite closely so that a wiping action is exerted against the tool blade as it enters or is withdrawn from the sheath or container.

It will be evident that the outwardly flared side portions which are stitched, riveted, or glued together will act as a shock absorber for the contained tool or other object if it happens that the same is dropped. In other words, instead of the edge of the tool or some fragile portion of the tool striking the ground or floor or some other hard object, the blow will be taken up by a buckling of the peripheral ridge, thereby saving the edge or body of the tool or blade itself. The container can be shaped so as to conform very closely to the outline of the article to be inserted therein, this being possible on account of the fact that the container itself is preferably composed of die-shaped impregnated fabric which can be easily constructed on a mold of any desired outline.

The interior of the container is preferably filled with grease or the like as shown at 24 into which the tool blade enters, thereby being preserved from rusting while in the container, and obviously the sheath itself will protect the saw teeth or the edges of the tool from contacting with other articles, thereby eliminating any possibility of damage to the tool or other object.

A tab 26 is provided attached to one of the upper edges of the sheath by means of a rivet or a line of stitching, this tab having an opening 28 therein whereby the tool and its container will be conveniently supported against the wall or on a hanger.

The device shown in Figure 4 is adapted for the reception of a channel-shaped tool such as a gouge or the like, this device being also formed in two abutting portions 30 and 32 which have flared edges, these edges being attached to each other by means of a line of stitching or the like 34. A pair of felt pads 36 is also preferably positioned at the open end of this gouge container which is also preferably filled with grease so as to preserve the tool, the grease being automatically retained in the container by means of the action of the felt pads.

At Figure 5, is illustrated a container for a drill shank or the like composed of two juxta-posed portions 40 and 42, each having a flared edge 44, the edges being joined together in any suitable manner. A pair of felt pads 46 and 48 is provided at the entrance to this container, the same being spaced apart as shown in the figure to allow the ready insertion of the drill or bit into the device.

In Figure 6 is shown a composite container 50 adapted for the reception of a plurality of tools, the same being composed of a pair of juxta-posed members which are not necessarily similar, but which may be variously shaped for joining together so as to accommodate a variety of tools. Here again the edges 52 are flared and joined together by means of stitches, rivets or the like, and the interior of each of the sockets may also be filled with grease or similar material if desired, the tools being retained in their proper position by means of lines of stitching or the like 54 outlining each container and distinguishing the same from the adjacent container. Here again a plurality of felt pads or the like may be placed at the top to insure proper retaining of the contained lubricant.

It will be seen that herein is provided a tool container which is simple of construction and easy of manufacture, and which is also quite economical, thereby enabling the manufacturers of tools to actually distribute their finished products in these containers, thereby assuring maximum use of the tool itself to the purchaser if kept in the container. Again the containers may be sold separately and adapted for the reception and proper preservation of various tools. Further, the device is not necessarily limited to tools, but may be applied with equal convenience and efficiency to other objects such as articles for sport as guns, golf clubs, dental and surgical instruments, or the like, precision instruments, as calipers, micrometers, and other objects.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

In a tool container, the combination of a sheath shaped to conform to the contour of the tool, said sheath comprised of die-pressed fabric impregnated with a grease-proof composition, and means for retaining grease therein, said means including a pair of felt wiping pads positioned at the entrance of the container and adapted to slidably receive the tool therebetween.

In testimony whereof I affix my signature.

FRANK RAFFLES.